Oct. 17, 1933.  R. V. WHITE  1,930,603
FASTENER
Filed Sept. 8, 1932
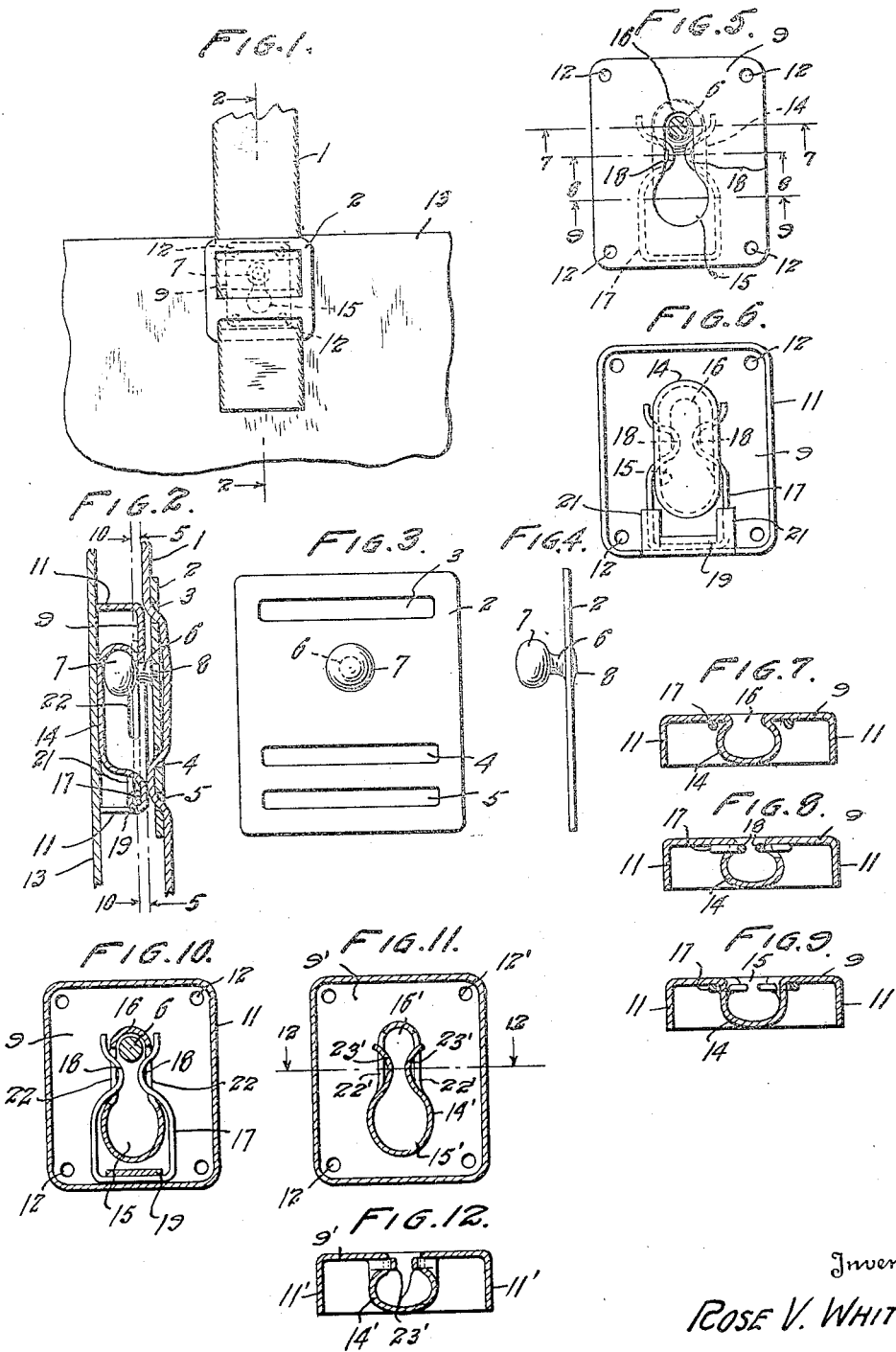
Inventor
ROSE V. WHITE
By Semmes & Semmes
Attorneys Patented Oct. 17, 1933

1,930,603

UNITED STATES PATENT OFFICE 1,930,603

FASTENER

Rose V. White, Clarkston, Wash.

Application September 8, 1932. Serial No. 632,210

1 Claim. (Cl. 24—224)

My invention relates to fasteners for fastening dresses and other fabric materials, and is intended to take the place of the ordinary hook and eye or snap fasteners. The device may be used to fasten shoulder straps to garments, or even for fastening heavy members, such as curtains on automobiles, but its principal use is as a dress fastener. Heretofore, where a female member held a male member it was difficult to locate the male member in the exactly proper position to engage the female member. Moreover, in the case of delicate fabrics such as those employed in undergarments, there is danger of tearing through the manipulation of the fastener.

It is an object of this invention to make it extremely easy to engage the male member in the female member, while at the same time providing a positive holding means to prevent accidental disengagement of the two members.

It is a further object of this invention to devise a fastener which prevents any possibility of moving parts coming in contact with the material that the fastener is adapted to engage in fastened position, thus tending to eliminate the element of accidental injury to the fabric.

A still further object is to devise a device of this nature which is simple in construction, easily and cheaply made, and which will give long service without repair or replacement.

With these and other objects in view, which may be incident to my improvements, the invention consists in the parts and combinations to be hereinafter set forth and claimed, with the understanding that the several necessary elements comprising my invention may be varied in construction, proportions and arrangement without departing from the spirit and scope of the appended claim.

In order to make my invention more clearly understood, I have shown in the accompanying drawing, means for carrying the same into practical effect without limiting the improvements in their useful applications to the particular constructions which, for the purpose of explanation, have been made the subject of illustration.

In the drawing:

Figure 1 is a top plan view showing a strap carrying the male member of my device, showing the position of the parts of the fastener in the engaging position in dotted lines, engaging a piece of cloth to hold it in the retained position;

Fig. 2 is a cross sectional view taken on the line 2—2 of Figure 1, looking in the direction of the arrows;

Fig. 3 is a top plan view of the male member of the fastener;

Fig. 4 is a side elevation of the male member of the fastener;

Fig. 5 is a top plan view of the female member of the fastener showing the position of the engaging spring, and the head of the male member in dotted lines; this view is taken along lines 5—5 of Figure 2, looking in the direction of the arrows;

Fig. 6 is a bottom plan view of the female member of the fastener;

Fig. 7 is a cross sectional view of the female member taken on the lines 7—7 of Figure 5, looking in the direction of the arrows;

Fig. 8 is a cross sectional view of the female member taken on the line 8—8 of Fig. 5, looking in the direction of the arrows;

Fig. 9 is a cross sectional view of the female member taken on the line 9—9 of Figure 5, looking in the direction of the arrows;

Fig. 10 is a cross sectional view of the female member taken on the line 10—10 of Figure 2, looking in the direction of the arrows;

Fig. 11 shows a modified form in which the retaining spring is struck from the metal of the recess itself, the view being similar to the view in Figure 10;

Fig. 12 is a cross section of the female member taken on the line 12—12 of Figure 11, looking in the direction of the arrows.

Referring to the drawing, in which like numerals indicate like parts, I have shown in Figure 1 a strap 1 carrying a male member of the fastener 2. The male member of the fastener is made of substantially flat material, such as flat metal, and is provided with a slot 3 in the upper portion, and slots 4 and 5 in the lower portion. As more clearly shown in Figure 2, the strap 1 passes through the slot 3 and along the back of the male member, then passes through slot 4 and through slot 5. The slots 3, 4 and 5 act as frictional holding members for the strap.

The male member is provided with a projecting member 6 having a head 7. The projecting member 6 may be held to the male member of the fastener 2 by riveting or any other desired means of fastening. In the construction shown the fastening is accomplished by means of a riveting construction 8, as shown in detail in Figure 2.

A female member in the form shown, which is a stamped metal form, is constructed of a metal body portion 9 having struck up from the body portion a projecting flange 11. Eyelets 12 are provided at the corners of the female member so that the female member may be sewed to the fabric to which it is attached. The fabric is shown in the drawing as a piece of fabric 13.

In the sheet metal form there is provided a pressed out recessed dome shaped portion 14 in the body of the female member 9. The recess in the dome shaped portion is of sufficient size so that the head 7 of the projecting member 6 will fit thereinto. The recess, however, is provided at the relatively flat surface of the female member 9 with a slot construction which is shown in Figure 5. This slot construction as shown is wide at the portion 15, narrowing towards the top at 16. The slot at 15 may be substantially as wide as the recess, and in the form shown in Figure 5 this is the case, though it is not necessary that the slot be of exactly the same width as the recess. At the narrow end of the slot, as at 16, the width is such that the head 7 is held in the recess, but the slot is wide enough for the projecting member 6 to slide in the slot.

The configuration of the slot shown in Figure 5 is pear-shaped. This exact configuration is not necessary; the slot may be heart-shaped, or any other desired shape which will accomplish the purpose contemplated. In the form of device shown in the drawing, the construction is made from metal stamping, and the recess in the slot can be struck out at the same time that the flanges 11 are struck out from the sheet metal of the female member.

To retain the head of the projecting member of the male device in its retained position, as shown in Figure 5, I have provided a spring 17, shown in dotted lines in Figure 5, and partly in dotted and partly in full lines in Figure 6. The complete spring is shown in Figure 10. The spring as shown, which of course may be varied within the scope of the invention, is substantially U-shaped with inwardly bent sections 18. At the bottom of the U the spring 17 is held in position by rolling up the metal of the female member, as at 19. To hold the spring securely in place, holding members 21 project along the arms of the U, as indicated in Figure 6.

In operation, the head of the male member is inserted in the large part 15 of the slot. It then fits in the recess, and is slid up past the retaining bulges 18 of the U-shaped spring in the position shown in dotted lines at the top of Figure 5 where it is held securely by the bulges 18 of the spring. The recess is provided, as indicated in Figure 10, with slots 22 which permit the bulges 18 of the spring 17 to enter into the recess.

In Figures 11 and 12 I have shown an alternate form in which corresponding elements to those already described are designated by the same reference characters primed. In this form the slots 22' are so struck out as to form spring members 23' from the body of the metal itself. These spring members 23' take the place of the bulges 18 on the spring member 17 to serve a similar purpose.

My fastener securely holds fabric or other devices together. It can not only be used for arrangements such as shoulder straps, as illustrated in Figure 1, but for holding automobile curtains. The attachment of the male and female members to their respective bases can, of course, be varied. In the form of male member to which the shoulder strap 1 is attached, I have a slotted formation, but of course any other method of attachment might be employed. Similarly the female member 9 is indicated as attached by sewing to the cloth piece 13, but any other known method of attachment of the female member to its base will be satisfactory.

The device is very easy to engage, and positive in action. The head 7 readily finds the enlarged portion of the slot in the female member and slides easily into the narrower portion of the slot where it is held in spring pressed engagement.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claim.

I claim:

A fastener comprising a female member of stamped metal having a pear shaped slot stamped therein forming a pressed out recessed dome shaped portion, a male member having a head adapted to enter the slot at the wider portion and fit in the recess in the dome shaped portion and having a neck to slide into the narrower portion, and spring means struck out from the opposed walls of the dome shaped portion, presenting opposite faces of substantially greater width than the thickness of the means forming the spring means for resilient engagement with the neck of the male member of the narrower portion of the slot.

ROSE V. WHITE.